(12) United States Patent
Hatch et al.

(10) Patent No.: US 10,708,769 B2
(45) Date of Patent: Jul. 7, 2020

(54) CLOUD ASSISTED ACCESSORY PAIRING

(71) Applicant: BOSE CORPORATION, Framingham, MA (US)

(72) Inventors: Mark C. Hatch, Brighton, MA (US); Michael W. Elliot, Grafton, MA (US)

(73) Assignee: BOSE CORPORATION, Framingham, MA (US)

( * ) Notice: Subject to any disclaimer, the term of this patent is extended or adjusted under 35 U.S.C. 154(b) by 233 days.

(21) Appl. No.: 15/848,521

(22) Filed: Dec. 20, 2017

(65) Prior Publication Data
US 2019/0191304 A1   Jun. 20, 2019

(51) Int. Cl.
| | |
|---|---|
| *H04W 12/00* | (2009.01) |
| *H04W 12/06* | (2009.01) |
| *H04W 12/10* | (2009.01) |
| *H04W 12/04* | (2009.01) |
| *H04L 29/06* | (2006.01) |
| *H04W 4/80* | (2018.01) |
| *H04W 4/21* | (2018.01) |
| *H04W 76/10* | (2018.01) |
| *H04L 29/08* | (2006.01) |

(52) U.S. Cl.
CPC ....... *H04W 12/00305* (2019.01); *H04L 63/06* (2013.01); *H04L 63/083* (2013.01); *H04W 4/21* (2018.02); *H04W 4/80* (2018.02); *H04W 12/003* (2019.01); *H04W 12/04* (2013.01); *H04W 12/04071* (2019.01); *H04W 12/06* (2013.01); *H04W 12/10* (2013.01); *H04L 67/306* (2013.01); *H04W 76/10* (2018.02)

(58) Field of Classification Search
CPC ....... H04W 12/06; H04W 4/80; H04W 12/04; H04W 12/10; H04W 76/10; H04L 63/06; H04L 63/083

USPC .......................................................... 726/4
See application file for complete search history.

(56) References Cited

U.S. PATENT DOCUMENTS

| | | | |
|---|---|---|---|
| 8,103,247 B2* | 1/2012 | Ananthanarayanan | H04W 12/06 455/411 |
| 9,130,771 B2 | 9/2015 | Millington et al. | |
| 9,480,096 B1* | 10/2016 | Lee | H04W 8/005 |
| 9,807,661 B1* | 10/2017 | Manepalli | H04W 36/245 |
| 9,992,316 B2* | 6/2018 | Hardi | H04M 1/6066 |
| 9,998,848 B2* | 6/2018 | Adhikari | H04W 4/80 |
| 2008/0057890 A1 | 3/2008 | McKillop et al. | |
| 2008/0070501 A1* | 3/2008 | Wyld | H04L 63/08 455/41.2 |
| 2008/0227393 A1* | 9/2008 | Tang | H04W 8/005 455/41.3 |
| 2010/0153709 A1* | 6/2010 | Thomas | G06F 21/445 713/155 |

(Continued)

OTHER PUBLICATIONS

International Search Report and Written Opinion from corresponding International Application No. PCT/US2018/063836 dated Feb. 11, 2019.

*Primary Examiner* — Shahriar Zarrineh
(74) *Attorney, Agent, or Firm* — Lando & Anastasi, LLP (57) ABSTRACT

Systems and methods for establishing a communication link between devices are provided. A first device receives an identifier for an accessory device, and receives a security key from a second device. The security key is associated with the accessory device and/or the identifier. The first device sends a communication request to the accessory device using the identifier and the security key.

19 Claims, 6 Drawing Sheets

(56) References Cited

U.S. PATENT DOCUMENTS

| | | | |
|---|---|---|---|
| 2011/0028091 A1* | 2/2011 | Higgins | H04L 63/0492 455/41.2 |
| 2011/0167262 A1* | 7/2011 | Ross | H04W 12/06 713/168 |
| 2012/0054493 A1* | 3/2012 | Bradley | H04W 8/005 713/171 |
| 2012/0083209 A1* | 4/2012 | Giles | H04W 12/0802 455/41.2 |
| 2013/0014232 A1* | 1/2013 | Louboutin | H04W 12/003 726/5 |
| 2013/0072119 A1 | 3/2013 | Park | |
| 2013/0095757 A1* | 4/2013 | Abdelsamie | H04W 4/50 455/41.1 |
| 2013/0149968 A1* | 6/2013 | Lu | H04W 4/80 455/41.2 |
| 2013/0260672 A1* | 10/2013 | Patil | H04M 1/7253 455/7 |
| 2014/0007209 A1* | 1/2014 | Zucker | H04W 12/06 726/7 |
| 2014/0052832 A1* | 2/2014 | Dina | B23K 9/1087 709/221 |
| 2014/0056570 A1* | 2/2014 | Saari | H04N 5/77 386/225 |
| 2014/0057569 A1* | 2/2014 | Toivanen | H04M 1/7253 455/41.3 |
| 2014/0099889 A1* | 4/2014 | Seo | H04W 4/80 455/41.1 |
| 2014/0259061 A1* | 9/2014 | Delpuch | H04L 69/08 725/37 |
| 2015/0137972 A1* | 5/2015 | Nepo | G08B 25/001 340/539.13 |
| 2015/0163221 A1* | 6/2015 | Bolin | H04W 76/14 726/7 |
| 2015/0180842 A1 | 6/2015 | Panther | |
| 2015/0222517 A1* | 8/2015 | McLaughlin | H04L 63/0435 713/156 |
| 2015/0282216 A1* | 10/2015 | Reshef | H04W 8/005 455/39 |
| 2015/0289227 A1* | 10/2015 | Becker | H04W 4/80 455/41.3 |
| 2015/0319557 A1* | 11/2015 | El-Hoiydi | H04R 25/556 455/41.2 |
| 2015/0334772 A1* | 11/2015 | Wong | H04W 4/025 455/557 |
| 2015/0351142 A1 | 12/2015 | Seymour et al. | |
| 2015/0351143 A1 | 12/2015 | Seymour et al. | |
| 2015/0371529 A1 | 12/2015 | Dolecki | |
| 2015/0373760 A1* | 12/2015 | Palin | H04W 4/80 455/41.2 |
| 2016/0065301 A1* | 3/2016 | Kukulski | H04B 7/26 455/41.2 |
| 2016/0234870 A1* | 8/2016 | Borges | H04W 4/44 |
| 2016/0359848 A1* | 12/2016 | Wilson | H04L 63/0853 |
| 2016/0360018 A1* | 12/2016 | Watson | H04M 1/6066 |
| 2016/0360341 A1 | 12/2016 | Srivatsa et al. | |
| 2017/0048385 A1* | 2/2017 | Kashimba | H04W 76/10 |
| 2017/0048613 A1* | 2/2017 | Smus | H04M 1/7253 |
| 2017/0094597 A1* | 3/2017 | Su | H04W 52/0209 |
| 2017/0201499 A1* | 7/2017 | McLaughlin | H04L 63/0428 |
| 2017/0223109 A1* | 8/2017 | Shoemake | H04W 76/10 |
| 2017/0272874 A1* | 9/2017 | Andersen | H04W 4/80 |
| 2017/0289798 A1* | 10/2017 | Weizman | H04L 63/18 |
| 2017/0359314 A1* | 12/2017 | Mathias | H04L 63/0428 |
| 2017/0359555 A1* | 12/2017 | Irani | H04L 43/0864 |
| 2017/0359717 A1* | 12/2017 | Adler | H04W 12/04 |
| 2018/0349242 A1* | 12/2018 | Mathews | H04L 63/061 |
| 2019/0191304 A1* | 6/2019 | Hatch | H04W 12/06 |
| 2019/0215597 A1* | 7/2019 | Ha | G06F 3/165 |
| 2019/0215673 A1* | 7/2019 | Choi | H04W 48/16 |
| 2019/0215879 A1* | 7/2019 | Song | H04W 4/20 |

* cited by examiner

CLOUD ASSISTED ACCESSORY PAIRING

BACKGROUND

Multiple devices establish one-way or two-way communications with each other, sometimes as part of a multi-device pico-net, especially in this era of Internet of Things (IoT) and short range near field communications capabilities. When two devices have exchanged and stored long term keys, so as to establish communications with each other at later times, they are considered as being bonded. Bonding is a process that establishes long term keys and conventionally requires user interaction with each device and requires each of the two devices to communicate a long term key to the other. In some instances, bonding is also called pairing, while pairing is more accurately a term for the process that initiates bonding.

SUMMARY OF THE INVENTION

Systems and methods disclosed herein are directed to simplified means of establishing a bonded relationship between two devices. In some examples the two devices may establish secure communication without each device having to share a key with the other, by instead retrieving an appropriate key from a cloud assisted storage of such keys. In some examples the secure communication may take place over a Bluetooth™ radio connection, but other examples may use other types of interfaces and/or communications protocols. In some examples, the two devices are accessory devices and a primary accessory device may receive a media stream from a source and share the media stream with a secondary accessory device. In certain examples, establishment of a bonded connection between the primary device and the secondary device is simplified as a benefit of the systems and methods disclosed herein.

According to one aspect, a method of establishing a communication link between a first device and an accessory device is provided. The method includes receiving, by the first device, an identifier associated with the accessory device, receiving, by the first device, from a second device that is not the accessory device, a security key associated with the identifier, and sending, by the first device, a communication request to the accessory device using the identifier and the security key.

In some examples, the security key is an authentication token configured to indicate, to the accessory device, that the first device is authorized to communicate with the accessory device.

The second device may be a controller or a remote server in various examples.

Certain examples include sending the identifier, by the first device, to the second device. In some examples, receiving the security key from the second device is responsive to sending the identifier to the second device. Certain examples also include receiving the identifier, by the second device from the first device, and sending the security key, by the second device, responsive to receiving the identifier.

Some examples include sending at least one of the identifier and the security key to a third device, by at least one of the first device or the second device. The third device may further send a second communication request to the accessory device using the security key.

According to another aspect, a method of establishing a communication link is provided that includes receiving a command to pair with an identified device, receiving a security key associated with the identified device, the security key received from a further device that is not the identified device, and sending a communication request to the identified device using the security key.

Some examples also include storing the security key associated with the identified device on a remote device. Certain examples may further include sending an identifier associated with the identified device to the remote device, wherein receiving the security key includes receiving the security key from the remote device in response to sending the identifier to the remote device. The remote device may receive the identifier and associate the identified device with a user account. Some examples include receiving the identifier, by the remote device, and sending the security key, by the remote device, responsive to receiving the identifier. Certain examples further include retrieving the security key, by the remote device, from a database.

According to some examples, the security key is an authentication token configured to indicate, to the identified device, an authorization to pair with the identified device.

Certain examples include sending by the further device, a second communication request to the identified device using the security key.

According to another aspect, a device is provided to share program content over a communication link with an accessory device. The device includes a communication interface configured to transmit and receive information and to receive the program content, and a control element coupled to the communication interface and configured to communicate with one or more additional devices that are not the accessory device, and to establish the communication link with the accessory device by receiving from the one or more additional devices a security key associated with the accessory device, and sending a pairing request to the accessory device using the security key.

In some examples, the security key is an authentication token configured to indicate, to the accessory device, that the first device is authorized to pair with the accessory device.

In certain examples, the control element is further configured to communicate with the one or more additional devices based upon the one or more additional devices being authenticated as an authorized controller or an authorized remote server. The control element may be further configured to send an identifier to the one or more additional devices and to receive the security key in response.

In some examples, the control element is further configured to receive the program content and selectively transmit at least a portion of the program content to the accessory device over the communication link.

According to yet another aspect, a communication method is provided that includes receiving an identifier of an accessory device, sending the identifier to a remote server, receiving from the remote server an indication of whether the identifier is known to the remote server, and querying a user whether to establish a communication link with the accessory device.

Some examples include storing the identifier by the remote server, which may also include an affiliation of the accessory device as one of an associated device or a known foreign device.

Certain examples include establishing the communication link with the accessory device. Some examples further include storing the identifier by the remote server with an indication that the communication link was established.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to systems and methods of establishing communication links (e.g., "pairing") between devices using a remote store of security keys to enable communication links with reduced user intervention, e.g., without requiring the user to place the devices into a pairing mode.

Figure 1:
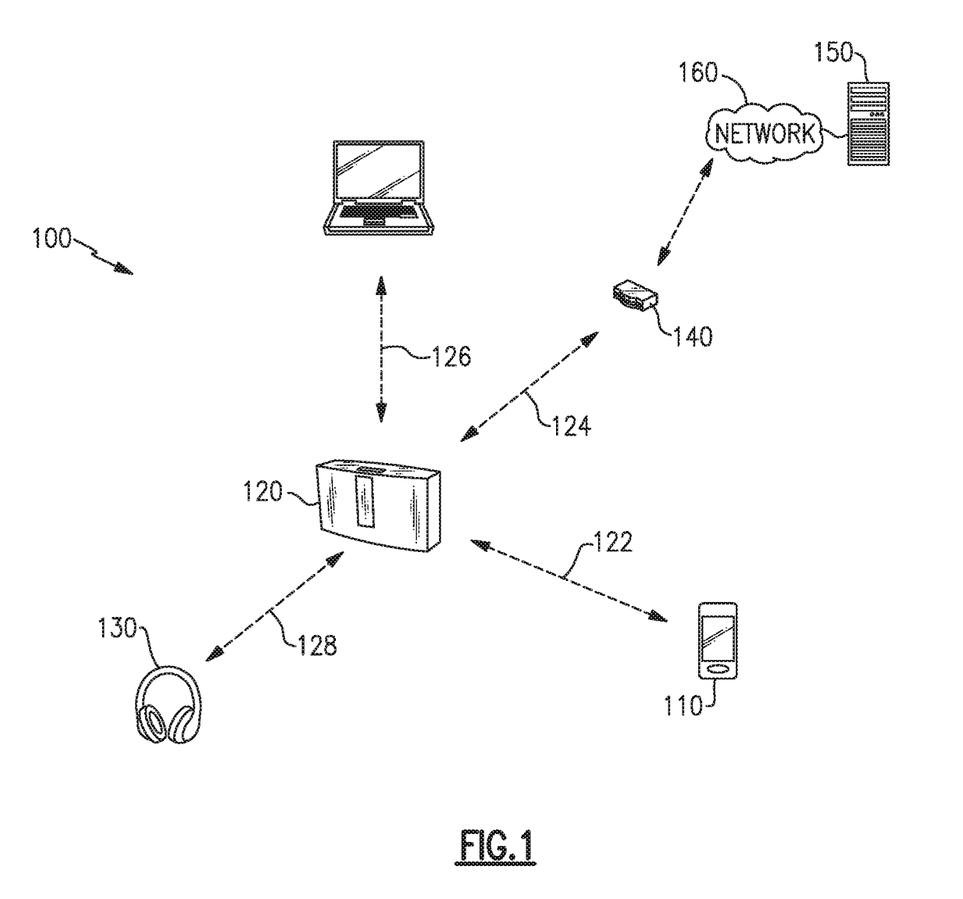
FIG. 1 is a schematic diagram of an example user environment in which various devices may establish communication links.

FIG. 1 illustrates a user environment 100 including a portable device 110, such as a smart phone, an associated device 120, a new (unassociated) accessory 130, and a network interface 140 to a remote server 150 through a communications network 160, such as the Internet.

In one example, the associated device 120 may be an audio device, such as a loudspeaker, capable of rendering media, such as an audio stream. For example, the associated device 120 may have an established communication link 122 with the portable device 110 through which to stream music files stored on the portable device 110. At other times, the associated device 120 may stream media through a different communication link, such as a communication link 124 allowing communication through the network interface 140 to a remote media server (not shown), or through a communication link 126 to a local device, such as a local media server, a television, or other device capable of providing files, content, data, etc. of various formats suitable for the associated device 120 to handle.

In some examples, the communication links 122, 126 may be a Bluetooth or other near field communication link, while the communication link 124 may be a wi-fi or IEEE 802.11 communication link. In other examples, any of the communication links 122, 124, 126 may be of any suitable type, wired or wireless. For certain types of communication link, however, a secure communication is established that uses long term keys, e.g., encryption keys, to ensure secure and authorized communications. In some examples, any of the devices shown may store the long term key of any other of the devices (e.g., for future use) to have a bonded relationship with the other device.

Certain examples of the systems and methods described herein allow the associated device 120 to establish a communication link 128 with the new accessory 130 without requiring a user to initiate a pairing process on the new accessory 130 and/or without the new accessory having to communicate a security key to the associated device 120.

Figure 2A:
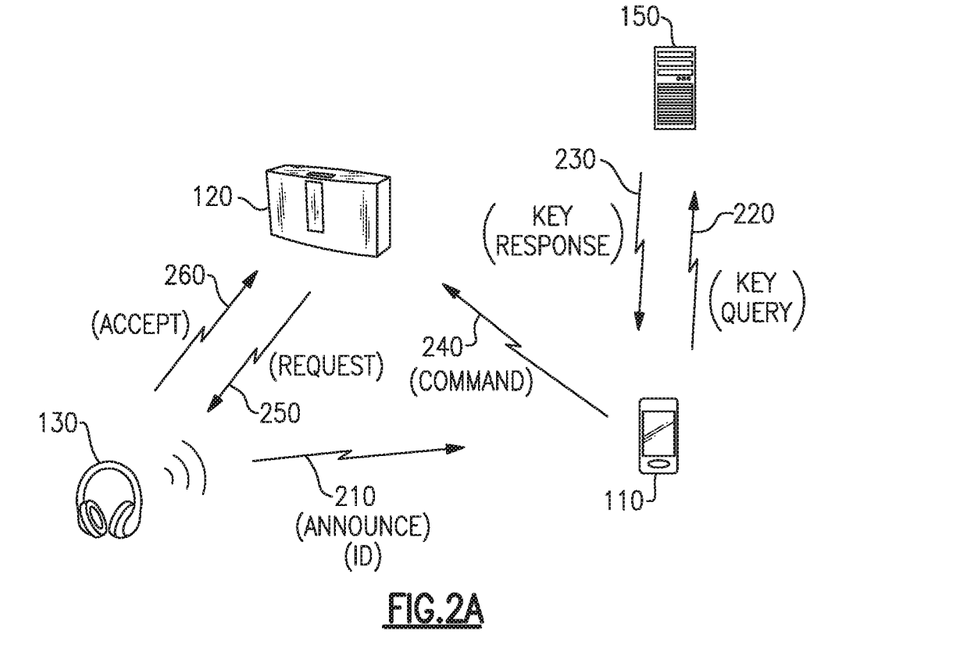
FIG. 2A is a schematic diagram of an example set of messages exchanged between various devices in an example method of establishing a communication link.

One such example is shown in FIG. 2A, which illustrates an example sequence of communication messages to establish a communication link between the associated device 120 and the new accessory 130. For example, upon being turned on by a user, the new accessory 130 may transmit an announcement 210 that announces its presence and provides an identifier that identifies itself, such as a serial number, a MAC address, a network layer address, or the like. The portable device 110, or the associated device 120 in some examples, may receive the announcement 210 and recognize that the new accessory 130 is new, or is of a certain manufacture, or of a certain type, for example, or any combination of these or other relevant information about the new accessory 130. In response to the announcement 210, the portable device 110 (or the associated device 120) may transmit a query to the remote server 150.

In some examples, the remote server 150 may store information about user accounts and about devices, and may store associations between user accounts and devices. Accordingly, a user account may identify a user (e.g., a device owner) and may associate devices with the user. Such information may be stored on the remote server 150 or on a separate system, such as a database server or file server, for example, with which the remote server 150 may communicate. Further, the remote server 150 may have access to, and may be able to provide, a stored key for the new accessory 130, such as a pre-stored key from the manufacturer of the new accessory 130. Alternately, the remote server 150 may have previously stored a key for the new accessory 130, having received information about the identifier of the new accessory 130 sometime in the past.

In various examples, the controller 110 may transmit the query 220 for a number of purposes. In one example, the query 220 requests that the remote server 150 notify the controller 110 whether the new accessory 130 is associated with a user account, such as a user account with which the controller 110 is associated, or another user account, or not associated with any user account. The query 220 may additionally or alternately request a key for the new accessory 130. In some instances, the remote server 150 may provide the key in a response 230.

In some examples, the controller 110 may prompt a user as to whether the user wants to associate the new accessory 130 to the user's account. Additionally or alternately the controller 110 may prompt the user whether to pair the new accessory 130 to the controller 110 or to another device, such as the associated device 120, for example. If the user makes a selection to pair the new accessory 130 to the associated device 120, the controller 110 may in response send a command 240 to the associated device 120. The command 240 may include the identifier of the new accessory 130 and the key provided by the remote server 150. In some examples, the command 240 is an instruction to the associated device 120 to establish the communication link 128 with the new accessory 130. In response to the command 240, the associated device 120 may send a request 250 to the new accessory 130, using the provided identifier and key, in response to which the new accessory 130 may send an acceptance 260.

Having a security key for the new accessory 130 (e.g., as provided by the remote server 150) may allow establishment of a communication link with the new accessory 130 without performing a conventional pairing and/or bonding process. For example, the controller 110 may transmit a message directly to the new accessory 130 using the key, and the new accessory 130 may be configured to respond to such messages because the message used the key associated with the new accessory 130. For example, the key may be an encryption key whose counterpart decryption key is persistently stored (e.g., in firmware) at the new accessory 130 to decrypt received messages. In some examples, the new accessory 130 will receive and decrypt messages that request a communication link, and may accept the request at least in part because the request used the key associated with the new accessory 130. For example, the new accessory 130 may inherently trust a message that arrives in a form that its decryption key can decrypt. In some examples, the key may be another form of key, such as a token or other pre-arranged authorization code (e.g., stored in firmware at manufacture, or processed or encrypted using a particular code), to which the new accessory 130 is pre-configured to respond or accept.

In some examples, the request 250 may be a message that instructs the new accessory 130 to enter a pairing mode in accord with a certain protocol, such as a Bluetooth™ pairing protocol. The new accessory 130 may accept the command to enter pairing mode based, at least in part, upon the fact that the associated device 120 used a proper security key (e.g., provided by the remote server 150) to transmit the request 250. In some examples, the security key may be used to encrypt a certificate associated with sender of the request 250 (e.g., the associated device 120), and in some examples the certificate may be an authentication certificate that certifies an identity of the sender, or a brand of manufacture of the sender, or other similar information, or otherwise certifies an authority of the sender to give commands or instructions to the new accessory 130. Accordingly, in some examples, the new accessory 130 may be configured to accept requests, instructions, commands, etc. from other devices that use an appropriate security key to send an encrypted certificate that authenticates the sending device's authority to issue the request, instruction, command, etc.

Figure 2B:
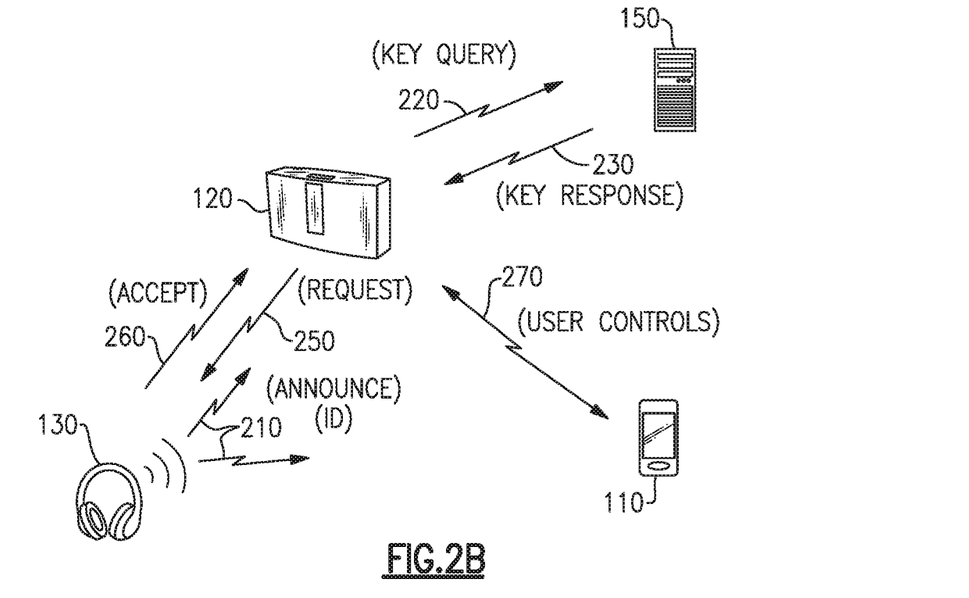
FIG. 2B is a schematic diagram of another example set of messages exchanged between various devices in an example method of establishing a communication link.

With reference to FIG. 2B, and in various examples, the associated device 120 itself may send a query 220 to the remote server 150, e.g., to request a key for the new accessory 130. In some examples, the associated device 120 may receive, send, or otherwise exchange one or more control messages 270 from the controller 110, which may reflect a user's selected option that the associated device 120 pair with the new accessory 130. Accordingly, the associated device 120 may send a query 220 to the remote server 150, and the remote server 150 may provide a key in a response 230. The associated device 120 may then use the key to send a request 250 for pairing to the new accessory 130, and the new accessory 130 may accept 260 the request 250 due, at least in part, to the fact that the request 250 was made using the key. In response to receipt of the request 250, the new accessory 130 may enter a pairing mode in which it is discoverable to the associated device 120 to initiate a pairing/bonding process.

In some examples, the associated device 120 may receive the announcement 210 from the new accessory 130, and may communicate with the controller 110 about the new accessory, e.g., via control messages 270, or the associated device may have its own user interface and a user may select an option that the associated device 120 should pair with the new accessory 130 (e.g., should send a query 220 for a key, etc.). Accordingly, in certain examples, a user control or user selected option may be made without a controller 110 and without the need for control messages 270. In some examples, the associated device 120 may be configured to automatically send a query 220 and attempt to pair with the new accessory 130. In some examples, such an automatic query 220 and pairing request 250 may be dependent upon the new accessory 130 not previously being associated with an existing user account.

Various suitable security controls may be incorporated into example systems and methods. In certain examples, the remote server 150 may require the controller 110 to login to the user's account, and may require the controller 110 to be associated with the user's account, and may require the new accessory 130 to be identified as "new" in a database, e.g., never previously associated with any other user's account, etc., or may require any combination of these or other conditions to be met before the remote server 150 provides the key associated with the new accessory 130. In some examples, the remote server 150 may require any of these or other equivalent or additional conditions before providing the key to various devices, such as to the associated device 120, or before associating the new accessory 130 with the user's account.

In some examples, the portable device 110 may maintain information about other devices it has communicated with in the past, and if the portable device 110 has not previously communicated with the new accessory 130, the portable device 110 may transmit a query 220 to the remote server 150, as discussed above. In other examples, the portable device 110 may transmit the query 220 if the portable device 110 has not previously communicated with the new accessory 130 and the new accessory 130 is of a certain manufacture or of a certain type, or some other criteria.

According to the above description of various examples of systems and methods disclosed herein, the new accessory 130 may become paired and bonded with an existing associated device 120 or other devices without requiring the user to, e.g., manually engage a button on the new accessory 130 to cause the new accessory 130 to enter a pairing mode. Accordingly, in some examples, the new accessory 130 may be placed into a pairing mode via user input to the controller 110, e.g., such as a user interface provided on the controller 110. As an illustrative example, the associated device 120 may be an audio device, e.g., a loudspeaker, such as a soundbar, for example, and may be streaming audio from a television. The new accessory 130 may be a personal audio device, such as headphones, for example. The controller 110 may be an application running on a smartphone, for example, and may control the soundbar. When the headphones are turned on, they may transmit an announcement including their identity. Either of the soundbar and/or smartphone may receive the announcement message and send the identity of the headphones to a remote server 150. The remote server 150 may respond to notify the soundbar or the smartphone that the headphones have not been associated with any user account, and the remote server 150 may provide the key associated with the headphones. For example, the identity of the headphones may be a serial number for the headphones, and the remote server 150 may have access to a data storage for the manufacturer of the headphones and therefore have access to the status of the particular headphones and the key for the particular headphones.

In some examples, the smartphone may then transmit a command to the soundbar (or to the television, for example) to "pair" with the headphones. In this example, "pair with" means to establish a secure communication link with. Within the command, the smartphone may include the key for the headphones, or the soundbar may request the key from the remote server 150 (or may have previously done so). The soundbar may then transmit a request to the headphones, using the key, and the headphones may accept the request because the soundbar used the key, e.g., which is unique to the headphones and/or otherwise recognized by the headphones as indicating authorization to establish the communication link. As an example use scenario of this example method, the soundbar may then re-transmit its audio stream (e.g., from the television) to the headphones, and a wearer of the headphones may then listen to the television at a personal listening volume unrelated to the soundbar's listening volume, for example.

In other examples, the controller 110 may allow a user to select any set of devices to "pair," e.g., to establish a communication link therebetween, as desired. For example, the associated device 120 may be a laptop and the new accessory 130 may be a digital camera to supply image files to the laptop. In some examples, the controller 110 may be, e.g., an application running on the laptop, such that the associated device 120 and, e.g., the controller 110, do not necessarily need to be distinct physical devices in all cases.

Figure 3:
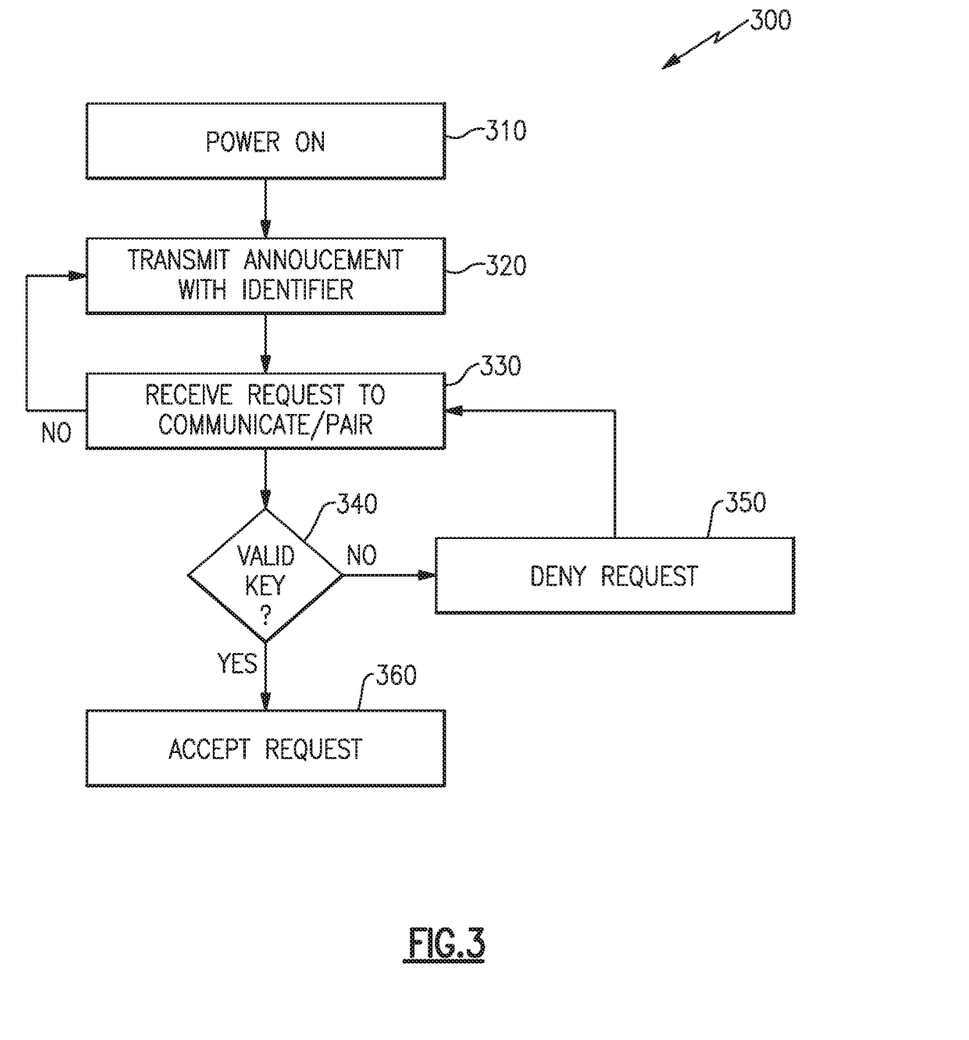
FIG. 3 is a flow chart of an example method that may be performed by an accessory device.

With reference to FIG. 3, an example method 300 may be implemented by a new accessory, such as the new accessory 130. The new accessory may be powered on (block 310) and may transmit an announcement (block 32) including an identifier for the new accessory. In some examples, the new accessory may transmit an announcement only if it is new, e.g., never before configured, or if it has been reset to factory defaults. In other examples, the new accessory may transmit the announcement based upon other conditions or not conditions, and may transmit the announcement at intervals. The new accessory may receive a request (block 330) to pair and/or establish a communication link, and may confirm whether the request includes a valid key (block 340). If there is no valid key, the new accessory may deny the request (block 350) (e.g., by sending an explicit denial or by taking no action), but if there is a valid key associated with the received request, the new accessory may accept the request (block 360) by, e.g., sending an acknowledgement to the sender of the request.

Figure 4:
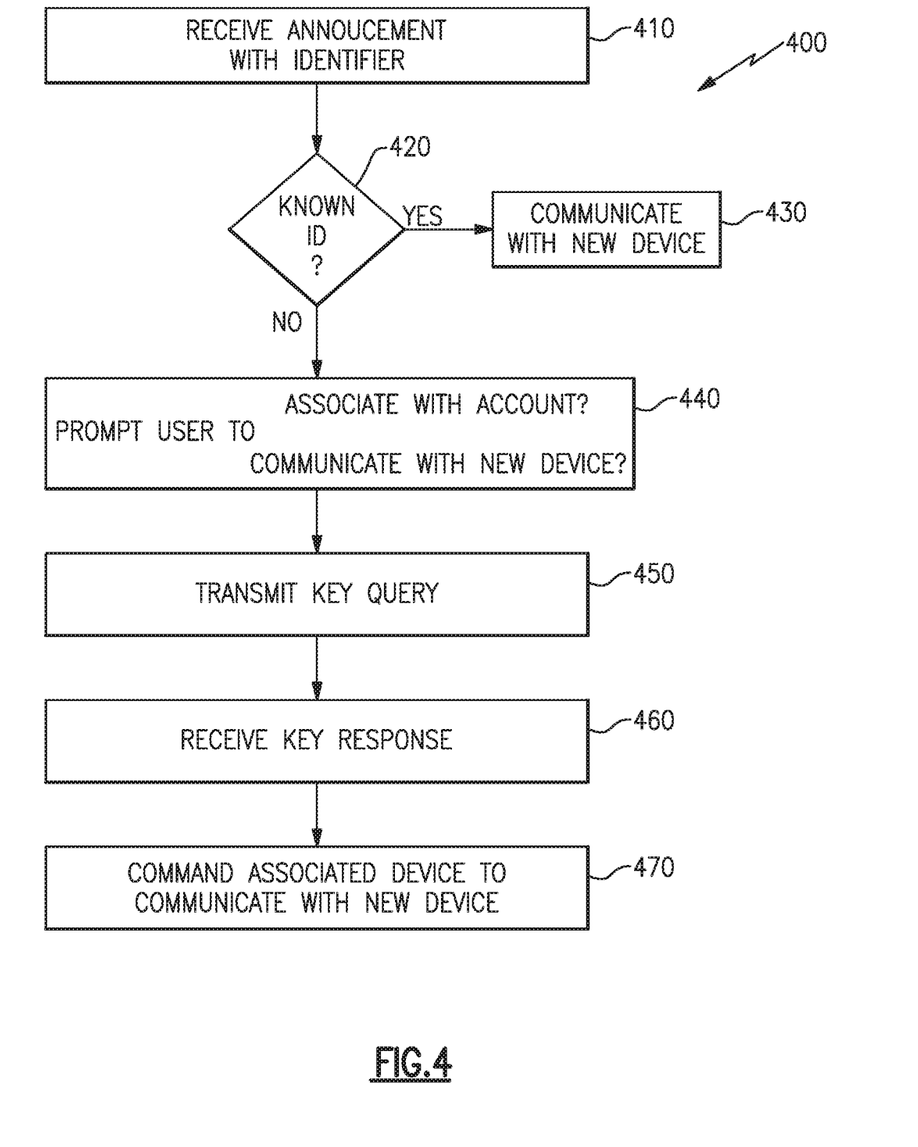
FIG. 4 is a flow chart of an example method that may be performed by a controller.

With reference to FIG. 4, an example method 400 may be implemented by a controller, such as the controller 110, which may be a software application that provides a user interface running on an associated device, in some examples. The controller may receive an announcement that includes a device identifier (block 410) (e.g., from the new accessory) and may check whether the identifier is known (block 420) to the controller. If the device identifier is already known to the controller, the controller may proceed to communicate with the identified device (block 430), or may in some examples prompt a user what to do, such as to command a different device, e.g., the associated device 120, to communicate with the identified device. If the device identifier is new, e.g., not known to the controller, the controller may optionally prompt the user (block 440) whether to associate the new accessory to the user's account and/or to pair an associated device with the new accessory. The controller may also transmit a query (block 450) to, e.g., a remote server, to retrieve a key for the new accessory, and may provide the device identifier as part of the query. The remote server may respond with the key for the new accessory, and the controller may receive the response (block 460) and may command (block 470) an associated device to pair with the new accessory, and may include the device identifier and the key as part of the command.

Figure 5:
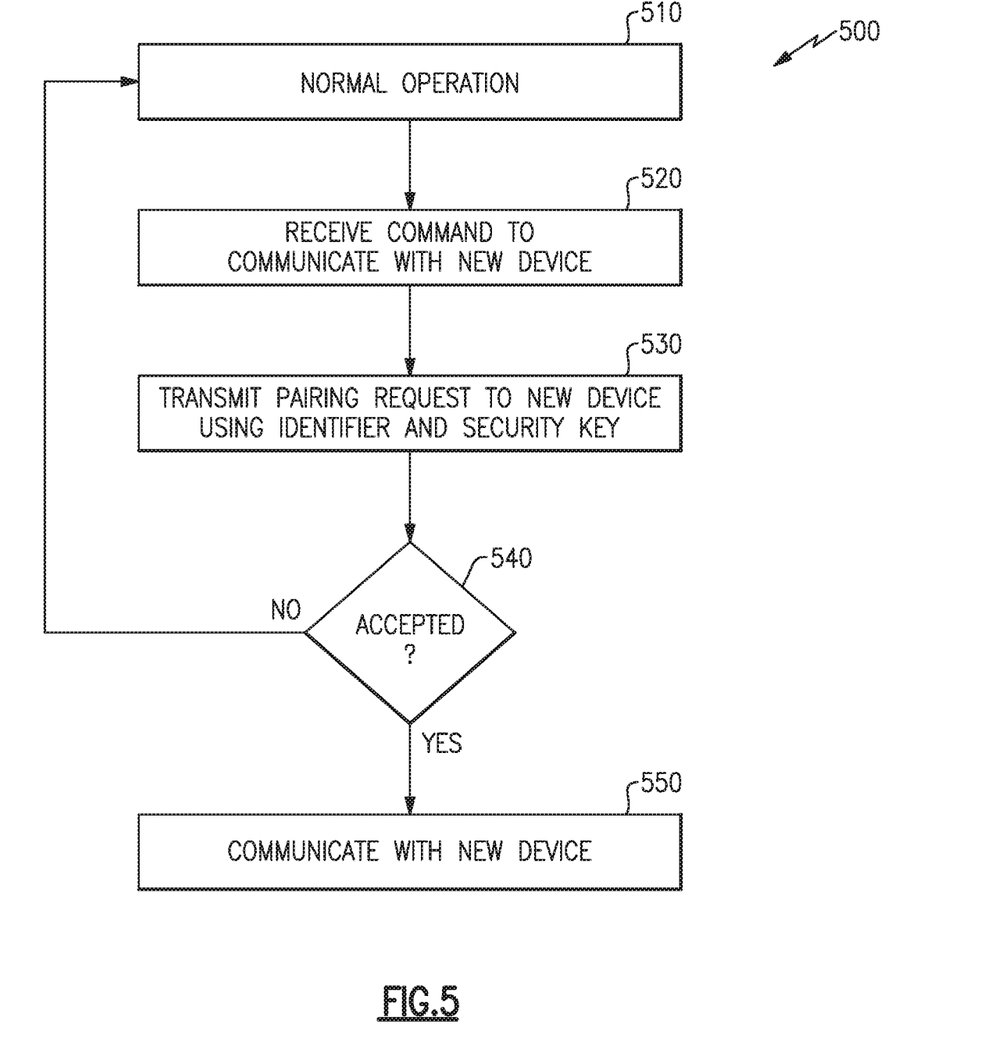
FIG. 5 is a flow chart of another example method that may be performed by an accessory device.

With reference to FIG. 5, an example method 500 may be implemented by an associated device, such as the associated device 120, to establish a communication link with a new accessory. The associated device may be operating normally (block 510) and may receive a command to pair, e.g., establish a communication link, with the new accessory (block 520). The command may include a device identifier and a key for the new accessory. The associated device may then transmit a pairing request to the new accessory (block 530) using the device identifier and the key. The associated device may monitor for a response from the new accessory as to whether the request is accepted (block 540), and if the request is accepted the associated device and the new accessory may communicate with each other (block 550). If the request is explicitly not accepted, or if a timeout period goes by without a response, the associated device may continue with normal operation.

In some examples, a command or other notification to an associated device to establish a communication link with a new accessory may fail to include a key or may fail to include a suitable device identifier, or both. In such cases, the associated device may, in some examples, communicate with the remote server or another device to request and retrieve a key and/or a proper device identifier. For example, a device identifier that is a serial # may have been provided, but a MAC address for the identified device may be necessary to communicate with the identified device. Accordingly, the serial number may be translated into a MAC address by, e.g., the remote server 150. In some examples, a MAC address may be provided by the identified device itself in response to an address resolution message or similar communication.

In some examples, the new accessory may be required to be associated with the user's account before pairing is authorized. For example, the remote server may require association of an unassociated new accessory before providing a key for communication with the new accessory. In some examples, a new accessory may already be associated with another user's account, and the remote server may require an authorization from the other user, or may require some other form of authentication or authorization before providing the key to the new accessory. For example, the new accessory may be associated with another user's account, but the other user is nearby the associated device and wants to pair with the associated device for temporary reasons, such as sharing a current media stream, transferring files, etc.

In some examples, the new accessory may be a foreign device, in that the remote server has no prior awareness of the device, and accordingly doesn't know the key, the MAC, or any association status of the new accessory. For example, the new accessory may be from a different manufacturer. Nonetheless, in certain examples, an associated controller may still be used to manage/direct communication links between associated devices and such a foreign device. In such cases, the foreign device may need to be manually placed into pairing mode by the user, in some examples, but the associated device may be commanded by the controller to scan/respond to the foreign device and initiate or complete a pairing/bonding process, thereby simplifying device management for the user.

In some examples, a foreign device with which a communication link has been established (e.g., from any device associated with the user's account), may include an identifier to be stored on the remote server and associated with the user's account, e.g., as a known device. For example, when a new accessory is a foreign device, and any of the existing devices (e.g., the controller 110, the associated device 120) establishes a communication link with the foreign device, the existing device may send the identifier to the remote server and the remote server may store the identifier as that of a known device (e.g., known to the user and the user's associated devices). In some examples, if the foreign device is turned on at a later time and announces its presence (via a transmission), any of the existing devices associated with the user's account may determine that it is a known foreign device (e.g., by querying the remote server about the foreign device's identifier, to which the remote server may respond that it is a 'known device'), and may query the user (via a suitable user interface) whether to establish a communication link with the foreign device. In some cases, establishing a communication link with the foreign device may require placing the foreign device in a pairing mode.

It is to be understood that any of the functions of methods 300, 400, 500, or similar, and any components of the devices 110, 120, 130, 150, or similar, may be implemented or carried out with use of a microprocessor, a logic controller, logic circuits, a digital signal processor (DSP), or the like, or any combination of these, and may include analog circuit components and/or other components with respect to any particular implementation. Any suitable hardware and/or software, including firmware and the like, may be configured to carry out or implement components of the aspects and examples disclosed herein, and various implementations of aspects and examples may include components and/or functionality in addition to those disclosed.

Figure 6:
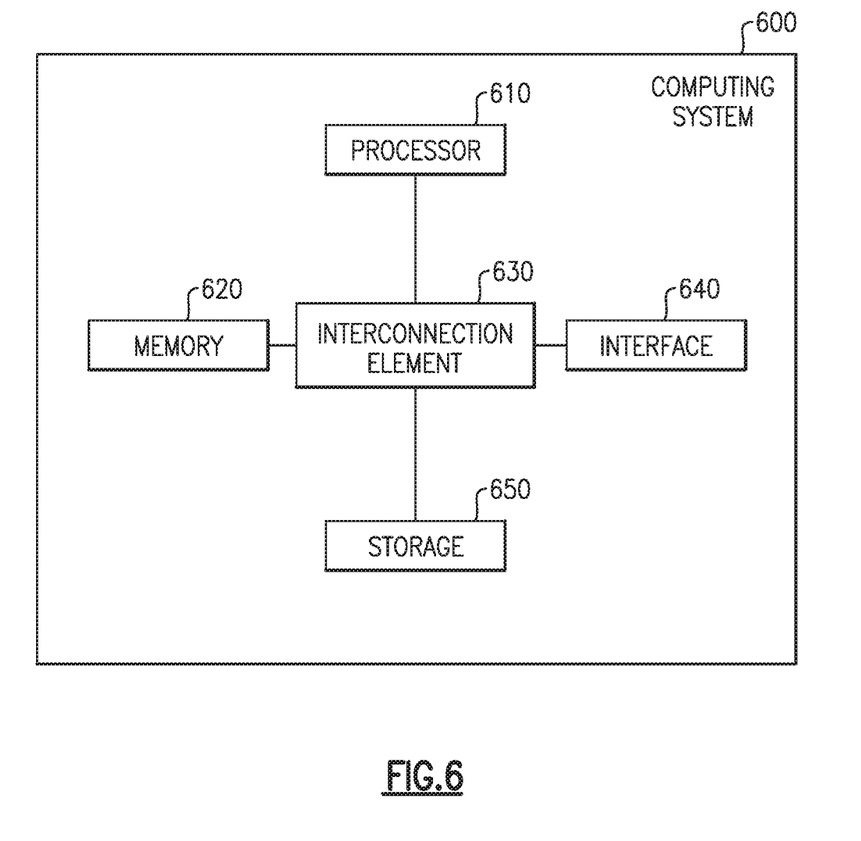
FIG. 6 is a schematic diagram of another example computer system.

Referring to FIG. 6, there is illustrated a block diagram of a computing system 600, in which various aspects and functions may be practiced. As illustrated in FIG. 6, at least one computing system 600 includes a processor 610, a memory 620, an interconnection element 630, an interface 640 and a data storage element 650. To implement at least some of the aspects, functions, and processes disclosed herein, the processor 610 performs a series of instructions that result in manipulated data. The processor 610 may be any type of processor, multiprocessor, controller, field programmable gate array (FPGA), application specific integrated circuit (ASIC), or digital signal processor (DSP). The processor 610 is connected to other system components, including one or more memory 620 devices, by the interconnection element 630.

The memory 620 may store one or more programs (e.g., sequences of instructions coded to be executable by the processor 610) and/or data, which may include device identifiers and bonded keys, for example, during operation of the computing system 600. Thus, the memory 620 may be a relatively high performance, volatile, random access memory 620 such as a dynamic random access memory 620 ("DRAM") or static memory 620 ("SRAM"). However, the memory 620 may include any device for storing data, such as a disk drive or other nonvolatile storage device.

Components of the computing system 600 are coupled by an interconnection element 630. The interconnection element 630 may include any communication coupling between system components such as one or more physical busses in conformance with specialized or standard computing bus technologies or interfaces, and may include differing technologies to couple to different components. The interconnection element 630 enables communications, including instructions and data, to be exchanged between system components of the computing system 600.

The computing system 600 may include one or more interface 640 devices such as input devices, output devices and combination input/output devices. Interface 640 devices may receive input or provide output. More particularly, output devices may render information for external presentation. Input devices may accept information from external sources. Examples of interface 640 devices include keyboards, mouse devices, trackballs, microphones, touch screens, printing devices, display screens, speakers, network interface cards, storage devices, etc. Interface 640 devices allow the computing system 600 to exchange information and to communicate with external entities, such as users and other systems.

The data storage element 650 includes a computer readable and writeable nonvolatile, or non-transitory, data storage medium in which instructions may be stored that define a program, or other object, that is executed by the processor 610. The data storage element 650 also may include information that is recorded, on or in, the medium, such as device identifiers and bonded keys, for example, and processed by the processor 610 during execution of one or more programs. More specifically, the information may be stored in one or more data structures specifically configured to conserve storage space or increase data exchange performance. The instructions may be persistently stored as encoded signals, and instructions may cause the processor 610 to perform any of the functions described herein. The medium may, for example, be optical disk, magnetic disk or flash memory 620, among others. In operation, the processor 610 or some other controller causes data to be read from the storage element 650 into another memory, such as the memory 620, that allows for faster access to the information by the processor 610 than does the storage medium included in the data storage element 650. A variety of components may manage data movement between the storage element 650 and other memory elements and examples are not limited to particular data management components. Further, examples are not limited to a particular memory system or data storage system.

Although the computing system 600 is shown by way of example as one type of computing system 600 upon which various aspects and functions may be practiced, aspects and functions are not limited to being implemented on the computing system 600 as shown in FIG. 6. Various aspects and functions may be practiced on one or more computers having different architectures or components than that shown in FIG. 6. For instance, the computing system 600 may include specially programmed, special-purpose hardware, such as an application-specific integrated circuit ("ASIC") tailored to perform a particular operation disclosed herein. Another example may perform the same operation using a grid of several computing devices running operating systems with various processors and/or several specialized computing devices running proprietary hardware and operating systems.

The computing system 600 may be a computing system 600 including an operating system that manages at least a portion of the hardware elements included in the computing system 600. In some examples, a processor or controller, such as the processor 610, executes an operating system. In other examples the processor 610 may include other forms of logic, such as an ASIC, FPGA, or DSP, and may have other forms of instruction sets, and may or may not execute an operating system.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of establishing a communication link between electronic devices, the method comprising:
   receiving, from an accessory device capable of rendering an audio stream, by a portable electronic device with which the accessory device is not paired, an identifier associated with the accessory device;
   transmitting, from the portable electronic device to a remote server, the identifier associated with the accessory device and a request for a security key for the accessory device to be retrieved from a database by the remote server;
   querying a user whether to establish a communication link with the accessory device;
   responsive to the identifier being known to the remote server and the user requesting that the communication link be established:
      receiving the security key, by the portable electronic device, from the remote server; and
      sending, by the portable electronic device, a command to an audio streaming device paired to the portable electronic device, the command including the identifier and the security key and instructions to establish a communications link between the audio streaming device and the accessory device, the command causing:
         the audio streaming device to send a communication request to establish the communications link to the accessory device, the communication request including the identifier and security key, and
         the accessory device to send an acceptance to the audio streaming device responsive to receiving the communication request.

2. The method of claim 1 wherein the security key is indicates, to the accessory device, that the audio streaming device is authorized to communicate with the accessory device.

3. The method of claim 1 wherein receiving the security key from the remote server is responsive to sending the identifier to the remote server.

4. The method of claim 1 further comprising receiving the identifier, by the remote server from the portable electronic device, and sending the security key, by the remote server, responsive to receiving the identifier.

5. The method of claim 1 further comprising sending at least one of the identifier and the security key to the audio streaming device, by the remote server.

6. The method of claim 5 further comprising sending by the audio streaming device, a second communication request to the accessory device using the security key.

7. The method of claim 1 further comprising entering a pairing mode, by the accessory device, in response to the communication request.

8. The method of claim 7 wherein entering the pairing mode includes actuation by a user.

9. The method of claim 1 wherein the remote server requires the accessory device to be identified as having never been previously associated with an account of someone other than the user prior to sending the security key to the portable electronic device.

10. The method of claim 1 wherein responsive to the remote server determining that the accessory device is associated with an account of someone other than the user, the remote server requires authorization from the someone prior to sending the security key to the portable electronic device.

11. A portable electronic device to share program content over a communication link with an accessory device capable of rendering an audio stream, comprising:
    a communication interface configured to transmit and receive information, and to receive the program content; and
    a processor and a memory coupled to the communication interface, the memory including instructions which, when executed by the processor, cause the processor to perform a method comprising:
       receiving, from the accessory device, prior to the portable electronic device being paired with the accessory device, an identifier associated with the accessory device;
       transmitting, from the portable electronic device to a remote server, the identifier associated with the accessory device and a request for a security key for the accessory device to be retrieved from a database by the remote server;
       querying a user whether to establish a communication link with the accessory device;
       responsive to the identifier being known to the remote server and the user requesting that the communication link be established:
          receiving the security key, by the portable electronic device, from the remote server; and
          sending, by the portable electronic device, a command to an audio streaming device paired to the portable electronic device, the command including the identifier and the security key and instructions to establish a communications link between the audio streaming device and the accessory device, the command causing:
             the audio streaming device to send a communication request to establish the communications link to the accessory device, the communication request including the identifier and security key, and the accessory device to send an acceptance to the audio streaming device responsive to receiving the communication request.

12. The device of claim 11 wherein the security key indicates, to the accessory device, that the audio streaming device is authorized to pair with the accessory device.

13. The device of claim 11 wherein the memory further includes instructions which, when executed by the processor, cause the processor to communicate with the remote server based upon the remote server being authenticated as an authorized remote server.

14. The device of claim 11 wherein the memory further includes instructions which, when executed by the processor, cause the processor to receive the program content and selectively transmit at least a portion of the program content to the accessory device over the communication link.

15. A communication method comprising:
receiving, from an accessory device capable of rendering an audio stream, by a portable electronic device with which the accessory device is not paired, an identifier associated with the accessory device;
transmitting, from the portable electronic device to a remote server, the identifier associated with the accessory device and a request for a security key for the accessory device to be retrieved from a database by the remote server;
receiving, by the portable electronic device, from the remote server an indication of whether the identifier is known to the remote server;
querying a user whether to establish a communication link with the accessory device;
responsive to the identifier being known to the remote server and the user requesting that the communication link be established:
receiving the security key, by the portable electronic device, from the remote server; and
sending, by the portable electronic device, a command to an audio streaming device paired to the portable electronic device, the command including the identifier and the security key and instructions to establish a communications link between the audio streaming device and the accessory device, the command causing:
the audio streaming device to send a communication request to establish the communication link to the accessory device, the communication request including the identifier and security key, and
the accessory device to send an acceptance to the audio streaming device responsive to receiving the communication request.

16. The method of claim 15 further comprising storing the identifier by the remote server.

17. The method of claim 16 wherein storing the identifier includes an affiliation of the accessory device as one of an associated device or a known foreign device.

18. The method of claim 15 further comprising establishing the communication link with the accessory device.

19. The method of claim 18 further comprising storing the identifier by the remote server with an indication that the communication link was established.

* * * * *

UNITED STATES PATENT AND TRADEMARK OFFICE
CERTIFICATE OF CORRECTION

PATENT NO. : 10,708,769 B2  
APPLICATION NO. : 15/848521  
DATED : July 7, 2020  
INVENTOR(S) : Mark C. Hatch et al.

Page 1 of 1

It is certified that error appears in the above-identified patent and that said Letters Patent is hereby corrected as shown below:

In the Claims

Column 11, Claim 2, Line number 64, delete "is".

Signed and Sealed this  
Eleventh Day of August, 2020

Andrei Iancu  
*Director of the United States Patent and Trademark Office*